United States Patent
Unemura

(10) Patent No.: US 7,672,571 B2
(45) Date of Patent: Mar. 2, 2010

(54) REPRODUCTION APPARATUS FOR SELECTIVELY SWITCHING BETWEEN FIRST INFORMATION AND SECOND INFORMATION

(75) Inventor: Toyoaki Unemura, Itami (JP)

(73) Assignee: Panasonic Corporation, Osaka (JP)

( * ) Notice: Subject to any disclaimer, the term of this patent is extended or adjusted under 35 U.S.C. 154(b) by 545 days.

(21) Appl. No.: 11/647,209

(22) Filed: Dec. 29, 2006

(65) Prior Publication Data

US 2007/0110402 A1 May 17, 2007

Related U.S. Application Data

(62) Division of application No. 09/959,894, filed on Nov. 13, 2001, now abandoned.

(51) Int. Cl.
*H04N 5/91* (2006.01)
*H04N 5/00* (2006.01)

(52) U.S. Cl. .............................. 386/95; 386/46; 386/125

(58) Field of Classification Search ........................ None
See application file for complete search history.

(56) References Cited

U.S. PATENT DOCUMENTS 6,134,377 A * 10/2000 Komedashi et al. ........... 386/46
6,363,204 B1 * 3/2002 Johnson et al. ................ 386/46

FOREIGN PATENT DOCUMENTS

JP 5-314743 11/1993
JP 7-240882 9/1995

* cited by examiner

*Primary Examiner*—Thai Tran
*Assistant Examiner*—Heather R Jones
(74) *Attorney, Agent, or Firm*—Wenderoth, Lind & Ponack, L.L.P.

(57) ABSTRACT

In a reproduction apparatus (100A), an information signal generation unit (Pa) generates a first information signal (Sav) from a recording medium (11). An information signal input unit (1, 8a) inputs a second information signal (Stv) which is provided from an external information source via a requested channel. When switching between the information signals, a control unit (8a) stores the current state of reproduction, so that reproduction will be restarted from the stored state when switching back to the original information signal.

6 Claims, 12 Drawing Sheets

REPRODUCTION APPARATUS FOR SELECTIVELY SWITCHING BETWEEN FIRST INFORMATION AND SECOND INFORMATION

This is a divisional of Ser. No. 09/959,894 filed Nov. 13, 2001 now abandoned.

TECHNICAL FIELD

The present invention relates to a reproduction apparatus which switches, for reproduction and display, between an externally-inputted video/audio signal and a video/audio signal reproduced from an internally-incorporated recording medium, e.g., an optical disk.

BACKGROUND ART

FIG. 12 schematically shows the structure of a conventional television receiver with an internal video CD reproduction apparatus proposed in Japanese Patent Application No. 6-30003 (Japanese Patent Laid-Open Publication No. 7-240882). The television receiver with an internal video CD reproduction apparatus 1000 (abbreviated as a "television with an internal reproduction apparatus") comprises a common television receiver with a video CD reproduction apparatus incorporated therein. The television with an internal reproduction apparatus 1000 chiefly includes: a TV input terminal 1, a video input terminal 2, an AV input selector switch 3 (denoted as "AVSW" in the figure), an RGB processor 4, a display 5, an audio controller 6, a loudspeaker 7, a control unit 8, an operation key input unit 9, and a video CD reproduction apparatus 10. The operation key input unit 9 generates an operation signal So in response to a key manipulation by a user.

The CD reproduction apparatus 10, which is accommodated inside the television with an internal reproduction apparatus 1000, reproduces a video CD to generate an internal AV signal Sav.

On the other hand, the TV input terminal 1 and the video input terminal 2, which are respectively coupled to AV signal sources lying external to the television with an internal reproduction apparatus 1000, are provided in order to introduce AV signals to the interior. Specifically, the TV input terminal 1 is coupled to an external television signal source (not shown), such as a receiver apparatus for television broadcast waves which are distributed from external broadcast stations in a wired or wireless manner, to receive a television signal Stv therefrom. The video input terminal 2 is coupled to an external AV signal source (not shown), such as a portable or stationary-type video cassette recorder or a video camera, for receiving an external AV signal Svc therefrom.

The RGB processor 4 and the display 5 are selectively coupled to one of the TV input terminal 1, the video input terminal 2, and the video CD reproduction apparatus 10 via the AV input selector switch 3, so as to receive any one of the television signal Stv, the external AV signal Svc, or the internal AV signal Sav depending on how they are coupled.

The AV input selector switch 3 is coupled to the operation key input unit 9 via the control unit 8. Based on the operation signal So which is input from the operation key input unit 9, the control unit 8 causes the AV input selector switch 3 to be selectively coupled to one of the TV input terminal 1, the video input terminal 2, and the video CD reproduction apparatus 10 which corresponds to a service-providing source desired by the user. As a result, one of the television signal Stv, the video signal Sv, and the internal AV signal Sav which the user wishes to view is outputted to the RGB processor 4 and the display 5.

The RGB processor 4 converts a video component of the incoming signal from the AV input selector switch 3 into RGB signals for output. The display 5, coupled to the RGB processor 4, displays images based on the received RGB signals.

Similarly, the audio controller 6 converts an audio component of the incoming signal from the AV input selector switch 3 into an audio signal for output. The loudspeaker 7, coupled to the audio controller 6, generates sounds based on the received audio signal.

The control unit 8 is also coupled to the video CD reproduction apparatus 10, the RGB processor 4, and the audio controller 6 for controlling the operation thereof based on the operation signal So, and also controls the AV input selector switch 3 to output one of the aforementioned television signal Stv, video signal Sv, and internal AV signal Sav which is desired by the user.

The operation of the television with an internal reproduction apparatus 1000 having the aforementioned configuration will be briefly described. The user operates the keys which are provided in the operation key input unit 9 to select one of the available service-providing sources (i.e., the externally-provided television signal source, the video signal source, and the video CD reproduction apparatus 10 in this example). This selection made by the user is passed to the control unit 8 as the operation signal So. In the case where the user selects the video CD reproduction apparatus 10, the control unit 8 controls the driving of the video CD reproduction apparatus 10 based on the operation signal So, and causes the AV input selector switch 3 to select the internal AV signal Sav which is outputted from the video CD reproduction apparatus 10.

If the user wishes to view a television broadcast during the reproduction of a video CD, the control unit 8 issues a pause signal to the video CD reproduction apparatus 10 in response to the operation made via the operation key input unit 9, and switches the coupling destination of the AV input selector switch 3 from the video CD reproduction apparatus 10 to the TV input terminal 1. If the user thereafter makes an operation for reselecting the video CD reproduction apparatus 10, the control unit 8 switches the coupling destination of the AV input selector switch 3 from the TV input terminal 1 to the video input terminal 2, and then from the video input terminal 2 to the video CD reproduction apparatus 10, in a toggling fashion.

Then, as soon as the coupling destination is switched to the video CD reproduction apparatus 10, a signal is sent to the video CD reproduction apparatus 10 for releasing it from pause, thereby allowing the video CD—which has been standing-by for reproduction since it was paused in response to the switching from the video CD reproduction apparatus 10 to the TV input terminal 1—to restart reproduction. Note that a pause signal does not need to be issued to the video CD reproduction apparatus 10 in response to the switching of the AV input selector switch 3, and the reproduction may be allowed to continue.

However, as is exemplified by the aforementioned television with an internal reproduction apparatus 1000, the conventional configuration allows the video CD to continue rotating during the pause (standby) period, while the laser irradiation section in the video CD reproduction apparatus used for CD data reading also continues operating, which is not desirable from the perspective of energy conservation. In addition, digital video disks (hereinafter abbreviated as "DVDs") utilizing the MPEG2 compression technique, which provides a higher image quality than conventional video CDs and the like utilizing MPEG1, are gaining prevalence. A DVD reproduction apparatus reads data by rotating a disk at a greater rate than a video CD. As a result, in a television apparatus having an internal DVD reproduction apparatus, allowing continued rotation of the DVD and continued operation of the laser irradiation section during a pause period of the DVD reproduction apparatus accompanying a switching of service-providing sources, as is conventionally practiced, will result in more substantial power consumption than in the case of video CDs.

Furthermore, the rotation of the video CD and the operation of the laser irradiation section will be continued not only during pause (standby) periods, but also when the user switches the service-providing source from a video CD as an internally-incorporated reproduction apparatus to an external signal source such as wire broadcasting and leaves it unattended, thereby resulting in deterioration in the quality of the apparatus and reduction in the device life as well as poor energy conservation.

An object of the present invention is to provide a reproduction apparatus which, in performing reproduction and display while switching between an externally-inputted video/audio signal and a video/audio signal reproduced from an internally-incorporated recording medium such as an optical disk, introduces improvements in different factors such as energy conservation, device life, and user feel, while maintaining a good balance among such factors.

DISCLOSURE OF THE INVENTION

To achieve the above objects, the present invention has the following aspects.

A first aspect of the present invention is directed to a reproduction apparatus for, in accordance with a user selection, selectively switching for reproduction between first information which is read from an internal recording medium and second information which is distributed from an externally-provided information source on a plurality of channels, comprising:

an information signal generation unit for reading the first information from the recording medium to generate a first information signal, an information signal input unit for specifying a requested channel to the information source, and inputting a second information signal in response to the second information provided on the specified channel, a selection signal generation unit for generating a selection signal representing a user selection in accordance with a user manipulation, an information signal selection unit for selecting either one of the first and second information signals in response to the selection signal, an information reproduction unit for reproducing information from the first or second information signal selected by the information signal selection unit, and an information reproduction control unit for controlling how to start reproduction of the first and second information when the information signals are switched for reproduction based on the selection signal, wherein the information reproduction control unit comprises:

a readout position storage unit for storing a readout position of the first information on the recording medium, a channel storage unit for storing a requested channel as specified to the information source by the information signal input unit, a first control unit for, if the first information is selected by the selection signal, causing the channel storage unit to store the requested channel as currently specified to the information source by the information signal input unit, and controlling the information signal generation unit to read the first information from the readout position stored in the readout position storage unit, and a second control unit for, if the second information is selected by the selection signal, causing the readout position storage unit to store a position at which the information signal generation unit is currently reading out the first information, and controlling the information signal input unit to specify the requested channel stored in the channel storage unit to the information source.

As described above, according to the first aspect, when information reproduced for display is switched during the reproduction of information from a recording medium, the reproduction is interrupted after the current reproduction position on the recording medium is stored. When reproduction of the information from the recording medium is again requested, the reproduction can be restarted immediately from the stored position at which reproduction was interrupted, so that the recording medium and the information signal generation unit can be stopped from activation during a standby period which exists after the interruption and before the restart of reproduction. As a result, excellent improvements can be obtained with respect to energy conservation, noisiness, noise, and device life.

According to a second aspect based on the first aspect, the information reproduction control unit further comprises a third control unit for stopping the information signal generation unit if the second information is selected by the selection signal.

According to a third aspect based on the second aspect, the information reproduction control unit further comprises a fourth control unit for reactivating the stopped information signal generation unit if the first information is again selected by the selection signal.

According to a fourth aspect based on the first aspect, the channel storage unit stores an initially-set channel, and if the second information is selected by the selection signal for a first time, the second control unit specifies the initially-set channel to the information source.

According to a fifth aspect based on the third aspect, the recording medium is an optical disk, and the information signal generation unit comprises:

a disk data reading unit for reading data from recording surface of the optical disk, and p an AV decoder unit for converting the read data into a video/audio signal to generate the first information signal, wherein the stopping and restarting of activation of the disk data reading unit is controlled by the third control unit and the fourth control unit.

According to a sixth aspect based on the fifth aspect, the information signal generation unit further comprises a screen saver output unit for displaying a still image, and the information reproduction control unit comprises a fifth control unit for, if pausing of reproduction of the first information is selected by the selection signal, stopping the disk data reading unit and causing the screen saver output unit to output a screen saver video signal instead of the first information signal.

According to a seventh aspect based on the fifth aspect, the information signal generation unit comprises:

a data structure determination unit for determining from the read data whether the data recorded on the optical disk is of a single sequential structure or a multi-sequential structure, and a data structure storage unit for storing a result of the determination, wherein the information reproduction control unit further comprises:

a sixth control unit for, if a multi-sequential structure is determined, prohibiting the first control unit from controlling the information signal generation unit to read the first information from a readout position stored in the readout position storage unit.

According to an eighth aspect based on the first aspect, a driving power source for supplying driving power to the information signal generation unit is further comprised, wherein the third control unit comprises a power supply stoppage unit for controlling the driving power source to stop supplying driving power.

As described above, according to the eighth aspect, a higher level of energy conservation can be realized by terminating the supply of driving power to the information signal generation unit.

According to a ninth aspect based on the eighth aspect, a timer for measuring a predetermined period of time since the second information is selected by the selection signal, and a power supply stoppage delaying unit for delaying the operation of the power supply stoppage unit until the predetermined period of time elapses are further comprised.

As described above, the ninth aspect is effective in the case where the standby period which exists after the interruption and before the restart of reproduction is short, where it is more advantageous from the perspective of energy conservation and device life to retain an activated state than once stop the activation of the recording medium and the information signal generation unit and thereafter reactivating them.

According to a tenth aspect based on the first aspect, the driving power source comprises:

a driving power generation unit for generating the driving power from main power which is supplied from an externally-provided main power source, and a main power supply switch for coupling the driving power generation unit to the main power source so as to supply main power, wherein the third control unit comprises a main power supply stoppage unit for controlling the main power supply switch to stop supplying the main power.

Thus, according to the tenth aspect, the very supply of main power to the driving power generation unit for generating driving power from the main power is terminated, whereby losses associated with the driving power generation unit consuming main power on its own independently from the information signal generation unit can be prevented. As a result, a higher level of energy conservation can be realized.

According to an eleventh aspect based on the tenth aspect, a timer for measuring a predetermined period of time since the second information is selected by the selection signal, and a main power supply stoppage delaying unit for delaying the operation of the main power supply stoppage unit until the predetermined period of time elapses are further comprised.

Thus, effects similar to those according to the ninth aspect are provided.

According to a twelfth aspect based on the fifth aspect, the information signal generation unit further comprises:

a screen saver output unit for displaying a still image, a data structure determination unit for determining from the read data whether the data recorded on the optical disk is of a single sequential structure or a multi-sequential structure, and a data structure storage unit for storing a result of the determination, wherein the information reproduction control unit further comprises:

a fifth control unit for, if pausing of reproduction of the first information is selected by the selection signal, stopping the disk data reading unit and causing the screen saver output unit to output a screen saver video signal instead of the first information signal, and a sixth control unit for, if a multi-sequential structure is determined, prohibiting the first control unit from controlling the information signal generation unit to read the first information from a readout position which is stored in the readout position storage unit.

Thus, the combined effects according to the first, second, third, fourth, fifth, sixth, and seventh aspects are provided.

According to a thirteenth aspect based on the twelfth aspect, a driving power source for supplying driving power to the information signal generation unit is further comprised, wherein the third control unit comprises a power supply stoppage unit for controlling the driving power source to stop supplying driving power.

Thus, effects similar to those according to the eighth aspect are provided.

According to a fourteenth aspect based on the thirteenth aspect, a timer for measuring a predetermined period of time since the second information is selected by the selection signal, and a power supply stoppage delaying unit for delaying the operation of the power supply stoppage unit until the predetermined period of time elapses are further comprised.

Thus, effects similar to those according to the ninth aspect are provided.

According to a fifteenth aspect based on the twelfth aspect, the driving power source comprises:

a driving power generation unit for generating the driving power from main power which is supplied from an externally-provided main power source, and a main power supply switch for coupling the driving power generation unit to the main power source so as to supply main power, wherein the third control unit comprises a main power supply stoppage unit for controlling the main power supply switch to stop supplying the main power.

Thus, effects similar to those according to the tenth aspect are provided.

According to a sixteenth aspect based on the fifteenth aspect, a timer for measuring a predetermined period of time since the second information is selected by the selection signal, and a main power supply stoppage delaying unit for delaying the operation of the main power supply stoppage unit until the predetermined period of time elapses are further comprised.

Thus, effects similar to those according to the ninth aspect are provided.

DETAILED DESCRIPTION OF THE INVENTION

The present invention will be more specifically described in accordance with the accompanying figures.

First Embodiment

Figure 1:
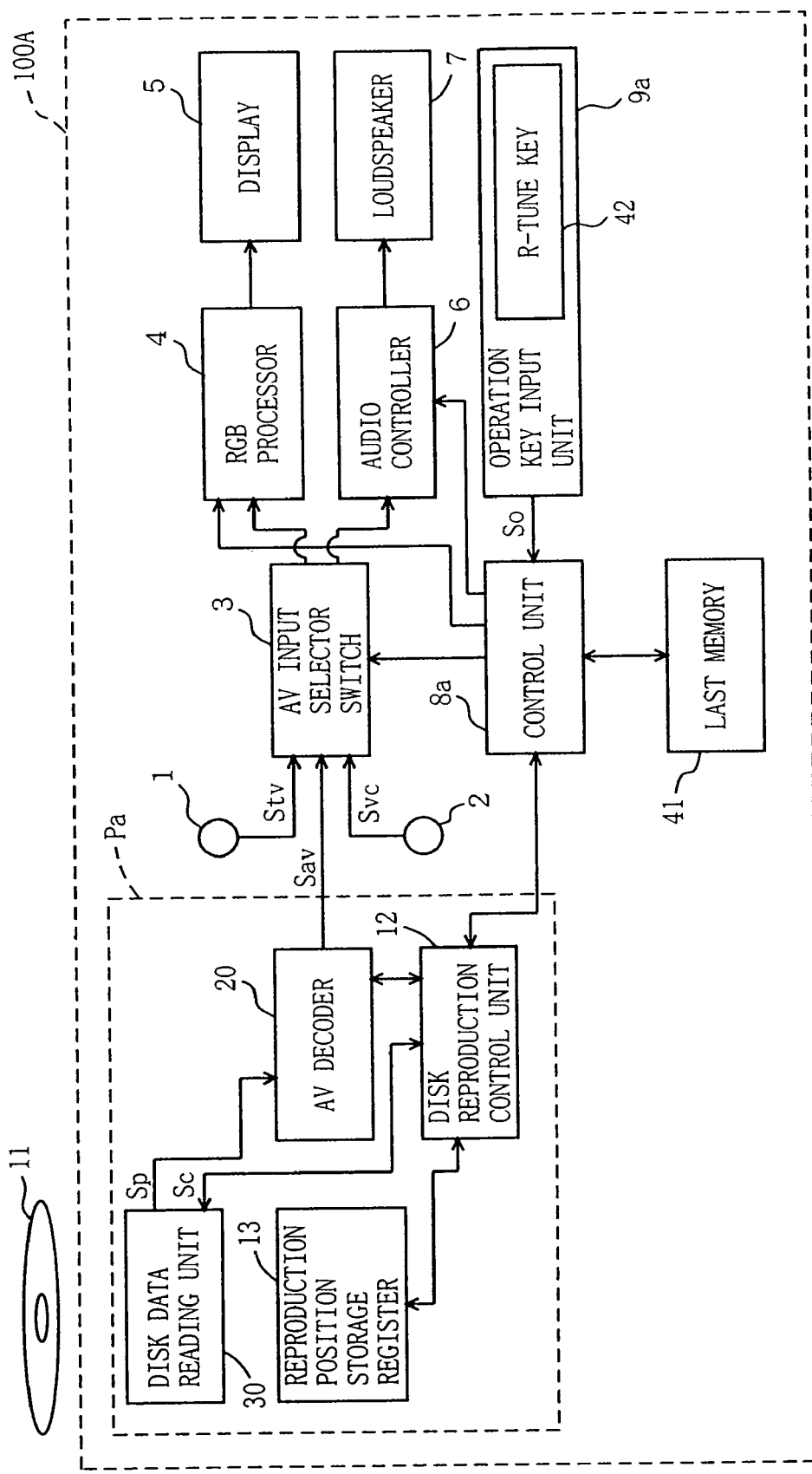
FIG. 1 is a block diagram illustrating a structure of a reproduction apparatus according to a first embodiment of the present invention.

With reference to FIG. 1, a television receiver with an internal reproduction apparatus according to a first embodiment will be described. The television receiver with an internal reproduction apparatus (hereinafter abbreviated as a "television with an internal reproduction apparatus") 100A according to the present embodiment internally incorporates a reproduction apparatus which reproduces information from a recording track of a rotating disk-shaped recording medium 11 that carries information recorded thereon. Examples of the recording medium 11 include optical disks such as video CDs or DVDs as well as magnetic disks such as hard disks. Examples of the reproduction apparatus include those which read information while moving a read section along a direction generally perpendicular to the recording track of a rotating recording medium. In the present specification, the following description will be directed to an example optical disk reproduction apparatus Pa in which an optical disk is employed as the recording medium 11.

The television with an internal reproduction apparatus 100A chiefly includes a TV input terminal 1, a video input terminal 2, an AV input selector switch 3, an RGB processor 4, a display 5, an audio controller 6, a loudspeaker 7, a control unit 8a, an operation key input unit 9a, a last memory 41, and an optical disk reproduction apparatus Pa. Although the television with an internal reproduction apparatus 100A includes a number of other component elements in addition to those mentioned above, the descriptions thereof are omitted since they are not particularly essential to the discussion of the features of the present invention.

Figure 12:
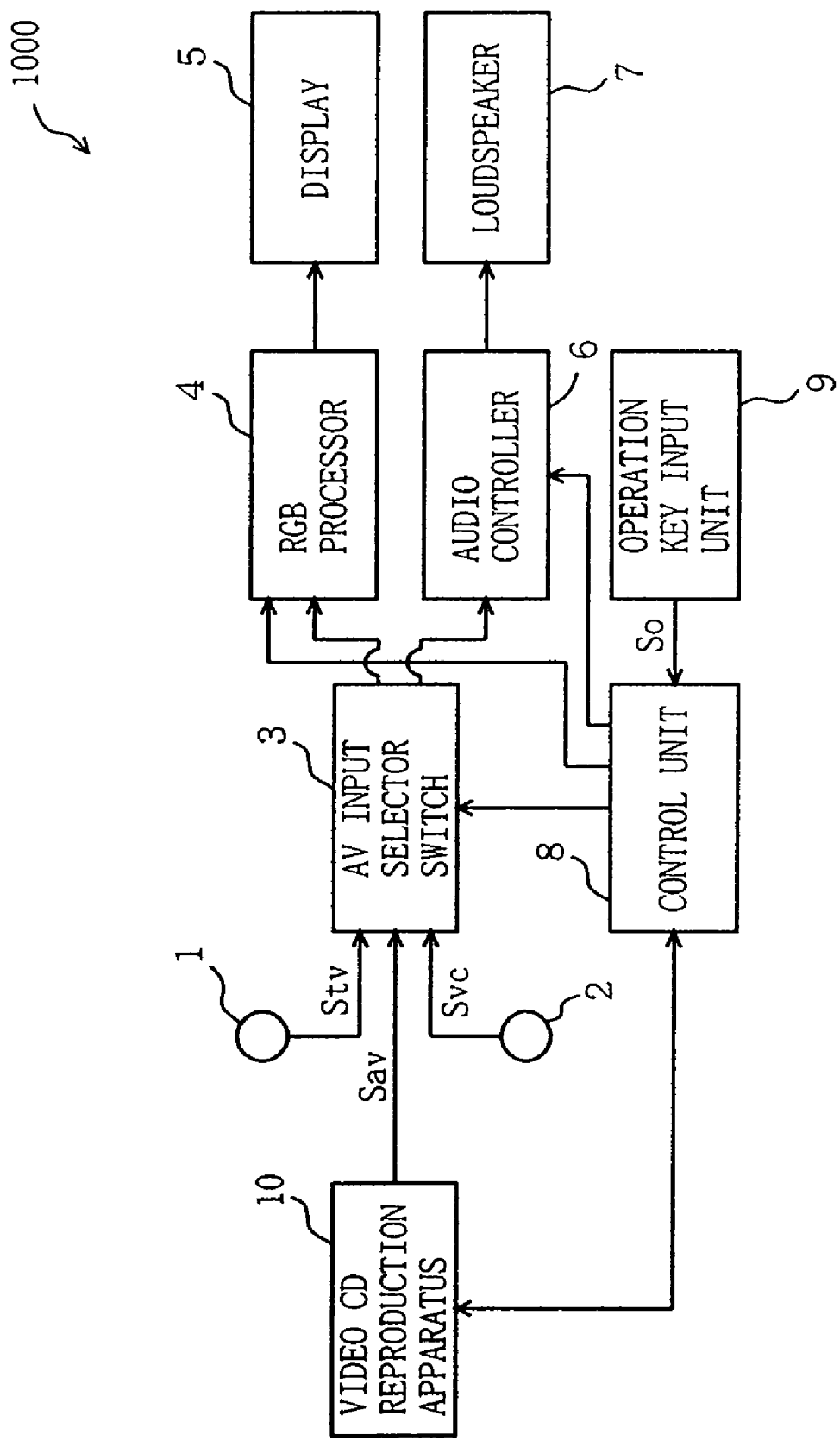
FIG. 12 is a block diagram illustrating a structure of a conventional reproduction apparatus.

The operation key input unit 9a is composed of the operation key input unit 9 shown in FIG. 12 plus an R-TUNE key 42. The R-TUNE key 42 is a means with which to input a user request for returning to a channel which was selected immediately before (i.e., Rapid TUNE). The operation key input unit 9a includes input means based on an infrared or wireless remote control.

The R-TUNE key 42 is provided in order to selectively provide mainly three different television viewing modes as described below:

In the first viewing mode, in response to a first manipulation during the viewing of a program (television broadcast) which is broadcast from a certain broadcast station, the channel of the television tuner is switched to the broadcast station of a program which had been viewed before the operation. In response to a subsequent manipulation, the channel of the television tuner is switched back to the broadcast station of the program which was being viewed at the time of the first operation.

In the second viewing mode, in response to a manipulation during the reproduction and viewing of the optical disk 11, the reproduction of the optical disk 11 is interrupted, and the broadcast from the broadcast station for a program which had been selected for viewing before the reproduction and viewing of the optical disk 11 becomes available for viewing. In response to a subsequent manipulation, the reproduction of the optical disk 11 which has been interrupted is restarted for viewing.

In the third viewing mode, in response to a manipulation during the reproduction and viewing of video content using a video cassette recorder, a television broadcast which was being viewed prior to the viewing of this video content becomes available for viewing in the place of the video content under reproduction. In response to a subsequent manipulation, the video content under reproduction again becomes available for viewing.

The last memory 41 stores the selection which had been valid until a new selection was made by a user, e.g., a channel number which had been previously selected. In case the user does not make any selection, predetermined selection information is stored in the last memory 41 as an initial value, the stored selection information being updated every time the user makes a selection.

The optical disk reproduction apparatus Pa includes a disk reproduction control unit 12, a reproduction position storage register 13, an AV decoder 20, and a disk data reading unit 30. The disk data reading unit 30 reads information while rotating the optical disk 11 with laser light irradiation. The AV decoder 20, which is coupled to the disk data reading unit 30, decodes the video and audio components which have been read from the optical disk 11 to generate an internal AV signal Sav. The AV decoder 20 and the disk data reading unit 30 will be later described in detail with reference to FIG. 2 and FIG. 3, respectively.

When the reproduction of the optical disk 11 is interrupted, the reproduction position storage register 13 stores the position at which the reproduction was interrupted, in order to make it possible to restart reproduction from the interrupted position when the user instructs to restart the reproduction of the optical disk 11.

The disk reproduction control unit 12 is coupled to the disk data reading unit 30, the AV decoder 20, the reproduction position storage register 13, and the control unit 8a in a bidirectional manner. In other words, the disk reproduction control unit 12 controls the operation of the disk data reading unit 30 and the AV decoder 20 based on a control signal from the control unit 8a, and also monitors the operation of the disk data reading unit 30 based on a reproduction control signal which is inputted from the disk data reading unit 30 and reproduction/recording signals which are inputted from the AV decoder 20 so as to output results of monitoring to the control unit 8a. Based on the results of monitoring, the control unit 8a determines and controls the operation of the disk reproduction control unit 12.

Figure 2:
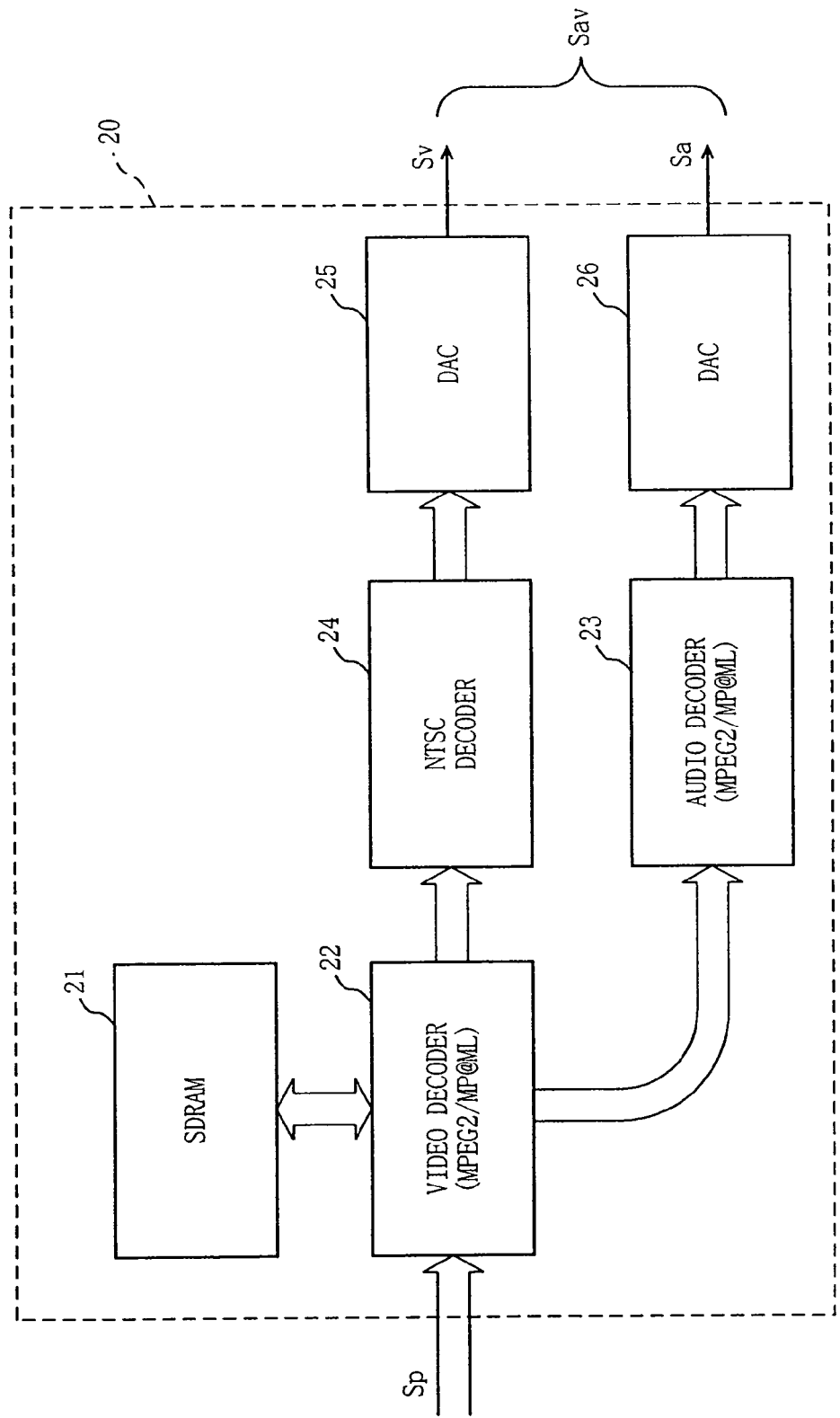
FIG. 2 is a block diagram illustrating a detailed structure of an AV decoder shown in FIG. 1.

With reference to FIG. 2, the AV decoder 20 will be described. The AV decoder 20 includes an SDRAM 21, a video decoder 22, an audio decoder 23, an NTSC decoder 24, a DAC 25, and a DAC 26. The SDRAM 21, which is composed of a 16 Mb memory, provides a working area for the video decoder 22.

The video decoder 22, which is coupled to the disk data reading unit 30, receives a reproduction signal Sp. The video decoder 22 outputs the audio component of the incoming reproduction signal Sp to the audio decoder 23, and also decodes the video component into various formats such as MPEG data and MP@ML, thereby generating a video signal.

The NTSC decoder 24, which is coupled to the video decoder 22, converts an incoming video signal into a digital NTSC signal. The DAC 25, which is coupled to the NTSC decoder 24, subjects the incoming digital NTSC signal to a digital/analog conversion to generate a video signal Sv. The DAC 25 is coupled to the aforementioned AV input selector switch 3.

The audio decoder 23, which is coupled to the video decoder 22, decodes audio data of various formats (such as AC3, MPEG, and linear PCM) contained in the incoming reproduction signal Sp, thereby generating audio data. The DAC 26, which is coupled to the audio decoder 23, subjects the incoming audio signal to a digital/analog conversion to generate an audio signal Sa. Note that the DAC 26 is coupled to the aforementioned AV input selector switch 3. Thus, the video signal Sv which is outputted from the DAC 25 and the audio signal Sa which is outputted from the DAC 26 are outputted to the AV input selector switch 3 as the aforementioned internal AV signal Sav.

Figure 3:
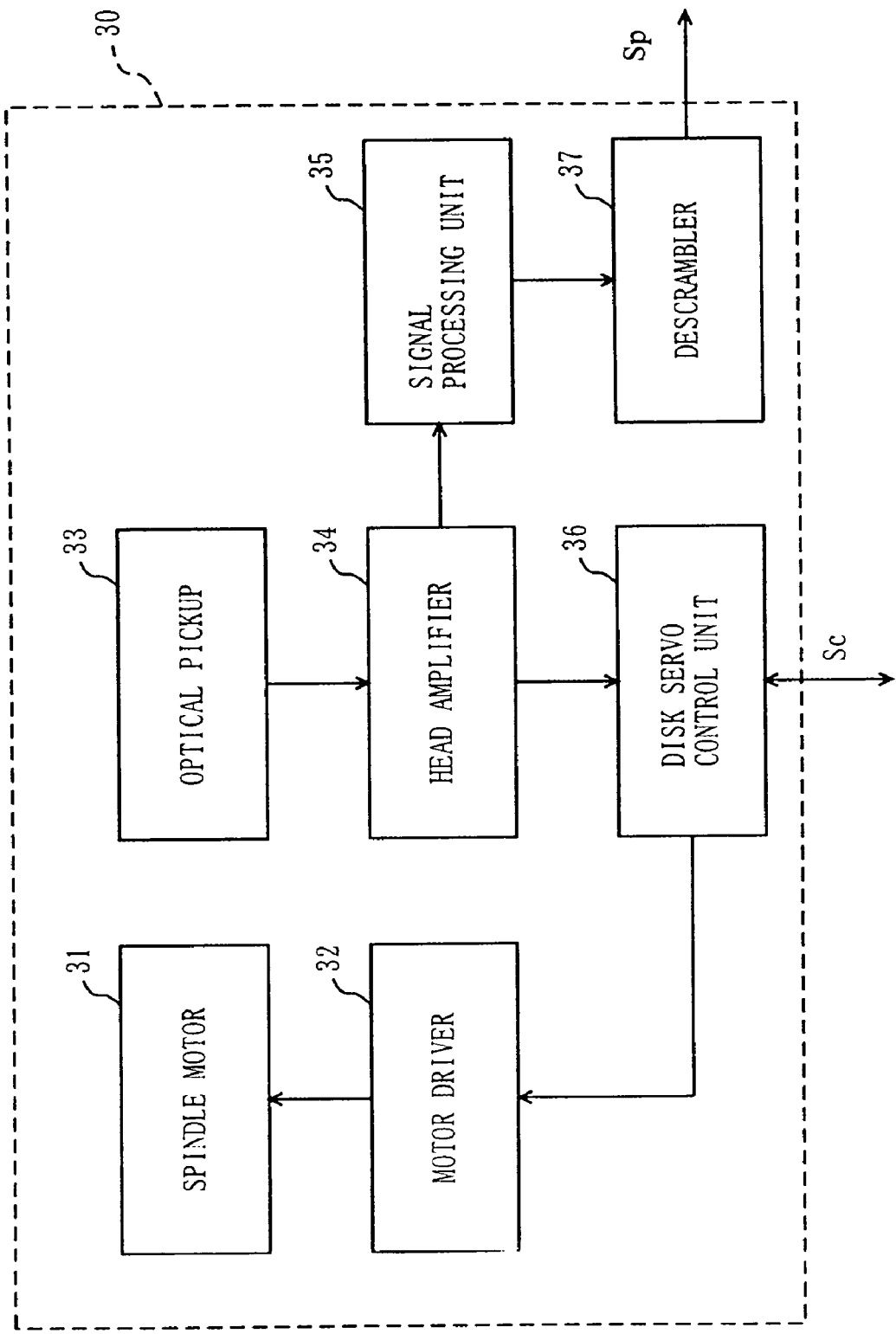
FIG. 3 is a block diagram illustrating a detailed structure of a disk data reading unit shown in FIG. 1.

With reference to FIG. 3, the disk data reading unit 30 will be described. The disk data reading unit 30 includes a spindle motor 31, a motor driver 32, an optical pickup 33, a head amplifier 34, a signal processing unit 35, a disk servo control unit 36, and a descrambler 37. The motor driver 32 drives the spindle motor 31, which rotates the optical disk 11.

The optical pickup 33 reads data from a recording surface of the rotating optical disk 11 to generate a read signal. The head amplifier 34 amplifies the read signal inputted from the optical pickup 33, and outputs it to the signal processing unit 35 and the disk servo control unit 36.

The signal processing unit 35 converts a contents information component in the incoming read signal into a digital signal, and outputs it to the descrambler 37. The descrambler 37 descrambles the incoming digital read signal to generate the aforementioned reproduction signal Sp.

Based on a control information component in the read signal which is inputted from the head amplifier 34, the disk servo control unit 36 generates a servo control signal Sc, which indicates the state of rotation of the optical disk 11. As described above, the disk reproduction control unit 12 controls the operation of the disk data reading unit 30 based on the servo control signal Sc. Based on an instruction from the disk reproduction control unit 12, the disk servo control unit 36 controls the motor driver 32.

The operation of the television with an internal reproduction apparatus 100A having the above-described structure will be briefly described below. When the user desires display/reproduction of the internal AV signal Sav which is outputted from the optical disk reproduction apparatus Pa, the user operates the operation key input unit 9a shown in FIG. 1 to input his/her desire. The operation key input unit 9a generates an operation signal So which corresponds to the user's operation, and outputs it to the control unit 8a. Based on the operation signal So, the control unit 8a switches the coupling destination of the AV input selector switch 3 from the TV input terminal 1 or the video input terminal 2 to the optical disk reproduction apparatus Pa. At the same time, the control unit 8a makes a request to the disk reproduction control unit 12 for reproducing the optical disk reproduction apparatus Pa.

The disk reproduction control unit 12 performs read control on the disk data reading unit 30. The disk data reading unit 30 operates the motor driver 32 so as to rotate the spindle motor 31, and moves the read section of the optical pickup 33 to an appropriate position so as to read data from the optical disk 11 in the form of an optical signal.

The data which has been read is amplified by the head amplifier 34 to be supplied to the signal processing unit 35 and the disk servo control unit 36. Based on the signal which has been read, the disk servo control unit 36 performs servo control for the motor driver 32 in order to properly control the rotation of the spindle motor 31. The signal processing unit 35 performs a process for digitalizing the signal which has been read, and supplies this to the descrambler 37.

The descrambler 37 deciphers the scrambling on the received signal, and provides the reproduction signal Sp, which has been converted in a form which allows for easy processing, to the AV decoder 20. By using the SDRAM 21, the video decoder 22 decodes the reproduction signal Sp which has been provided to the AV decoder 20 into video data and audio data.

The audio decoder 23 further decodes the audio data, which is outputted to the DAC 26 as digital audio data. The digital audio data is converted by the DAC 26 into an analog audio signal Sa. The video data which is outputted from the video decoder 22 is converted by the NTSC encoder into a digital format NTSC, and thereafter further converted by the DAC 25 into the video signal Sv.

The audio signal Sa and the video signal Sv are inputted to the AV input selector switch 3 as the internal AV signal Sav. In other words, the video signal Sv is inputted to the RGB processor 4 via the AV input selector switch 3, so as to be converted into RGB signals and displayed on the display 5 such as a CRT. Similarly, the audio signal Sa is inputted to the audio controller 6 via the AV input selector switch 3, and outputted from the loudspeaker 7 as a sound after its sound volume level and tone are controlled.

Next, the operation in the case where a user who is reproducing the optical disk 11 desires to again view a television broadcast which was being viewed immediately before beginning to reproduce the optical disk 11 will be described. Note that the television broadcast which was being viewed means a broadcast available on the channel which was being viewed. The user manipulates the R-TUNE key 42 in the operation key input unit 9a to input a request for again viewing the television broadcast which the user was viewing. The operation key input unit 9a generates an operation signal So which corresponds to this user operation, and outputs it to the control unit 8a.

Based on the operation signal So, the control unit 8a controls the television with an internal reproduction apparatus 100A so as to attain the aforementioned three kinds of viewing modes in accordance with the state of manipulation of the R-TUNE key 42 by the user. The three kinds of viewing modes will be described from the perspective of the AV input selector switch 3. It is assumed that television broadcasts from N broadcast stations are being distributed on N channels to the TV input terminal 1 in the form of a television signal Stv (where N is an arbitrary natural number). In this case, the expression "television signal Stv(N)" will be employed in order to distinguish between the broadcast stations (channels) which are the sources of distribution.

As for the aforementioned first viewing mode, let us assume that a user, who was viewing a television broadcast which is distributed from a broadcast station on channel N in the form of a television signal Stv(N), has switched the tuner and now is viewing a television broadcast which is distributed from a broadcast station on channel N−1 in the form of a television signal Stv(N−1). That is, the AV input selector switch 3 is coupled to the TV input terminal 1 as an input signal source, so that the incoming television signal Stv(N−1) is being supplied to the RGB processor 4 and the audio controller 6.

As the R-TUNE key 42 is manipulated, the control unit 8a keeps the AV input selector switch 3 coupled to the TV input terminal 1, switches the tuner of the television receiver from channel N−1 to "channel N" (as has been read out from the last memory 41), and stores "channel N−1" in the last memory 41. As a result, the television signal Stv(N) is inputted from the TV input terminal 1 instead of the television signal Stv(N−1), so that a television broadcast which is distributed in the form of the television signal Stv(N) becomes available for viewing. If the television broadcast on channel N−1 was not being viewed prior to the manipulation of the R-TUNE key 42, i.e., if N has not been stored, then the channel is switched to the initial value which is stored in the last memory 41.

As for the second viewing mode, let us assume that a user, who was viewing a television broadcast which is distributed from a broadcast station on channel N in the form of a television signal Stv(N), has begun reproducing the optical disk 11 on the optical disk reproduction apparatus Pa for viewing. That is, the AV input selector switch 3 is coupled to the optical disk reproduction apparatus Pa as an input signal source, so that the incoming internal AV signal Sav is being supplied to the RGB processor 4 and the audio controller 6.

As the R-TUNE key 42 is manipulated, the control unit 8a places the optical disk reproduction apparatus Pa on pause, and sets the tuner channel of the television receiver to "channel N" as has been read out from the last memory 41. Furthermore, the control unit 8a couples the AV input selector switch 3 to the TV input terminal 1. As a result, the television signal Stv(N) is provided to the RGB processor 4 and the audio controller 6 instead of the internal AV signal Sav, so that a television broadcast which is distributed on channel N becomes available for viewing.

In response to a subsequent manipulation, the control unit 8a restarts the hitherto-interrupted reproduction of the optical disk 11, stores the current channel N in the last memory 41, and causes the AV input selector switch 3 to couple to the optical disk reproduction apparatus Pa. As a result, the internal AV signal Sav is again provided to the RGB processor 4 and the display 5, so that the optical disk 11 becomes available for viewing.

As for the third viewing mode, let us assume that a user, who was viewing a television broadcast which is distributed from a broadcast station on channel N in the form of a television signal Stv(N), is reproducing a video content on a stationary-type video cassette recorder which is coupled to the video input terminal 2 for viewing. That is, the AV input selector switch 3 is coupled to the video input terminal 2, so that the incoming external AV signal Svc is being supplied to the RGB processor 4 and the audio controller 6.

As the R-TUNE key 42 is manipulated, the control unit 8a sets the tuner channel of the television receiver to "channel N" as has been read out from the last memory 41, and couples the AV input selector switch 3 to the TV input terminal 1. As a result, the television signal Stv(N) is provided to the RGB processor 4 and the audio controller 6 instead of the external AV signal Svc, so that a television broadcast which is distributed on channel N becomes available for viewing.

In response to a subsequent manipulation, the control unit 8a stores the current channel N in the last memory 41, and causes the AV input selector switch 3 to couple to the video input terminal 2. As a result, the external AV signal Svc is again provided to the RGB processor 4 and the display 5, so that the video content becomes available for viewing.

As has been set forth in connection with the aforementioned second viewing mode, if the user manipulates the R-TUNE key 42 so as to request the AV input selector switch 3 switch from the optical disk reproduction apparatus Pa to the TV input terminal 1, then the control unit 8a switches the AV input selector switch 3 to the TV input terminal 1, and makes a retention request to the disk reproduction control unit 12. Upon receiving this request, the disk reproduction control unit 12 immediately writes the current reproduction position data to the reproduction position storage register 13 and stops the operation of the disk data reading unit 30. If the R-TUNE key 42 is again manipulated, the control unit 8a switches the AV input selector switch 3 to the optical disk reproduction apparatus Pa, and makes a retention release request to the disk reproduction control unit 12. Based on the value which has been written to the reproduction position storage register 13, the disk reproduction control unit 12 reads the stored content and re-sets the readout position for the disk data reading unit 30. Then, the disk data reading unit 30 restarts reading of data from the optical disk 11 at the re-set position, which is outputted to the AV decoder 20.

Second Embodiment

Figure 4:
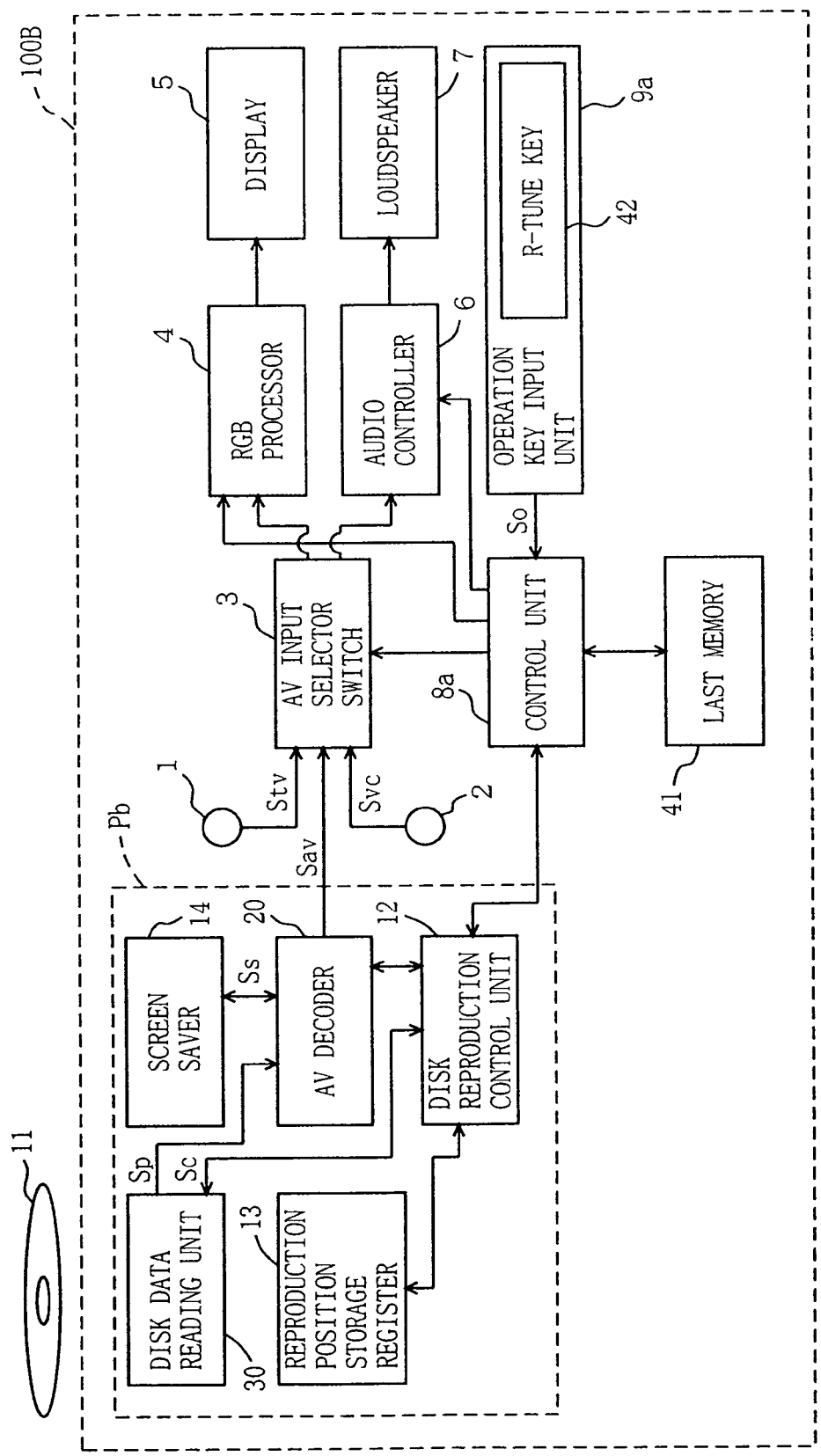
FIG. 4 is a block diagram illustrating a structure of a reproduction apparatus according to a second embodiment of the present invention.

With reference to FIG. 4, a television with an internal reproduction apparatus according to a second embodiment of the present invention will be described. The television with an internal reproduction apparatus 100B according to the present embodiment is constructed identically to the television with an internal reproduction apparatus 100A shown in FIG. 1 except that the optical disk reproduction apparatus Pa is replaced by an optical disk reproduction apparatus Pb. Furthermore, the optical disk reproduction apparatus Pb is constructed identically to the optical disk reproduction apparatus Pa except that a screen saver 14 for displaying an image indicating that the disk data reading unit 30 is stopped on the display 5 is additionally provided. Therefore, the descriptions of any portions which are common with the television with an internal reproduction apparatus 100A according to the first embodiment will be omitted, and only the features characteristic to the television with an internal reproduction apparatus 100B according to the present embodiment will be described.

Hereinafter, the operation of the television with an internal reproduction apparatus 100B will be described. In the present embodiment, the operation in the aforementioned second viewing mode differs from that according to the first embodiment described above. Specifically, if the R-TUNE key 42 is manipulated during the reproduction and viewing of the optical disk 11, the control unit 8a makes a temporary retention request to the disk reproduction control unit 12.

The disk reproduction control unit 12 immediately stores the current reproduction position in the reproduction position storage register 13, and stops the disk data reading unit 30. Furthermore, the disk reproduction control unit 12 drives the screen saver 14 via the AV decoder 20 so as to supply a screen saver signal Ss to the AV decoder 20. The AV decoder 20 outputs the screen saver signal Ss to the AV input selector switch 3, instead of the reproduction signal from the optical disk 11, as an internal AV signal Sav.

If the R-TUNE key 42 is manipulated again to request the reproduction and viewing of the optical disk 11 again, the control unit 8a controls the disk reproduction control unit 12 to stop the screen saver 14 from operating, reads the contents of the reproduction position storage register 13, and operates the disk data reading unit 30 so as to operate from that position.

Third Embodiment

Figure 5:
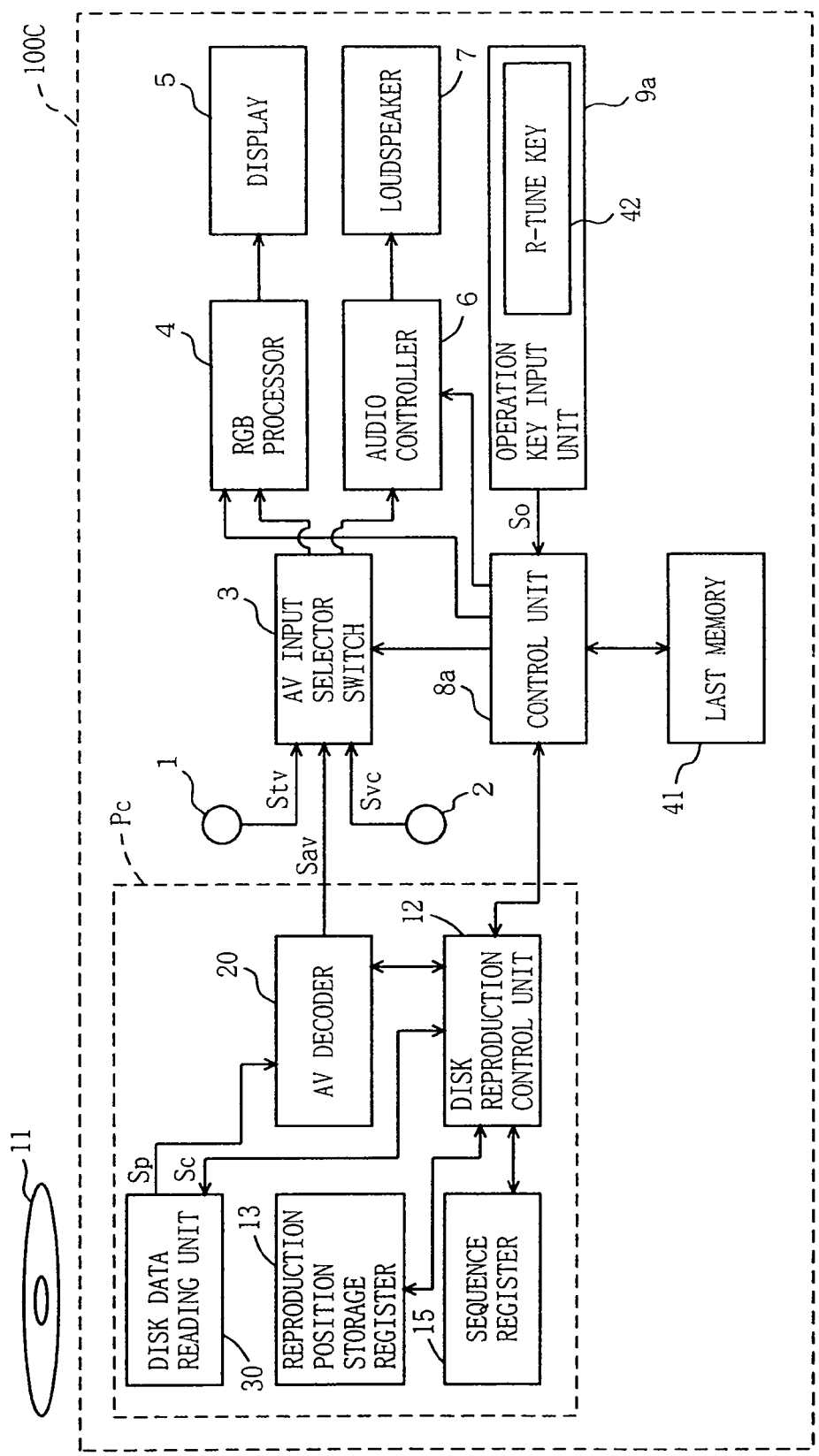
FIG. 5 is a block diagram illustrating a structure of a reproduction apparatus according to a third embodiment of the present invention.

With reference to FIG. 5, a television with an internal reproduction apparatus according to a third embodiment of the present invention will be described. The television with an internal reproduction apparatus 100C according to the present embodiment is constructed identically to the television with an internal reproduction apparatus 100A shown in FIG. 1 except that the optical disk reproduction apparatus Pa is replaced by an optical disk reproduction apparatus Pc. Furthermore, the optical disk reproduction apparatus Pc is constructed identically to the optical disk reproduction apparatus Pa except that a sequence register for storing whether the data which is recorded on the optical disk 11 has a single sequential structure or a multi-sequential structure is additionally provided. Therefore, the descriptions of any portions which are common with the television with an internal reproduction apparatus 100A according to the first embodiment will be omitted, and only the features characteristic to the television with an internal reproduction apparatus 100C according to the present embodiment will be described.

The television with an internal reproduction apparatus 100C supports reproduction of video disks, e.g., DVDs, being used as the optical disk 11. Such video disks are classified as a single sequential type or a multi-sequential type depending on the structure of their contents data. Video disks whose contents are movies and the like generally have their data recorded in a single sequential structure. On the other hand, video disks for special purposes, e.g., demonstration, have their data recorded in a multi-sequential structure.

Single sequential type video disks allow a reproduction position which exists at the time of temporary retention to be clearly grasped. On the other hand, multi-sequential type video disks generally do not allow a reproduction position which exists at the time of temporary retention processing to be clearly grasped. This may lead to a problem in that, when restarting reproduction from the point of retention, reproduction may begin from an unpredictable location. In order to avoid this situation, according to the present embodiment, the operation in the aforementioned second viewing mode is varied depending whether the optical disk 11 is of a single sequential type or a multi-sequential type.

At the beginning of the reproduction of the optical disk 11, it is determined by the disk reproduction control unit 12 whether the data structure type of the optical disk 11 is a single sequential or a multi-sequential, so as to be stored in the reproduction position storage register 13. If the user manipulates the R-TUNE key 42 to make a temporary retention request for the optical disk reproduction apparatus Pc, the control unit 8a asks the disk reproduction control unit 12 about the data structure type of the disk which is currently being reproduced. The disk reproduction control unit 12 reads out the data structure type of the optical disk 11 from the sequence register 15, and tells this to the control unit 8a.

If the optical disk 11 is of a single sequential type, the control unit 8a issues a temporary retention instruction to the disk reproduction control unit 12, as in the case of the television with an internal reproduction apparatus 100A according to the first embodiment. On the other hand, if the optical disk 11 is of a multi-sequential type, the control unit 8a does not give a temporary retention instruction to the disk reproduction control unit 12. If the temporary retention instruction involves switching the AV input selector switch 3, the control unit 8a only causes the AV input selector switch 3 to be switched.

Fourth Embodiment

Figure 6:
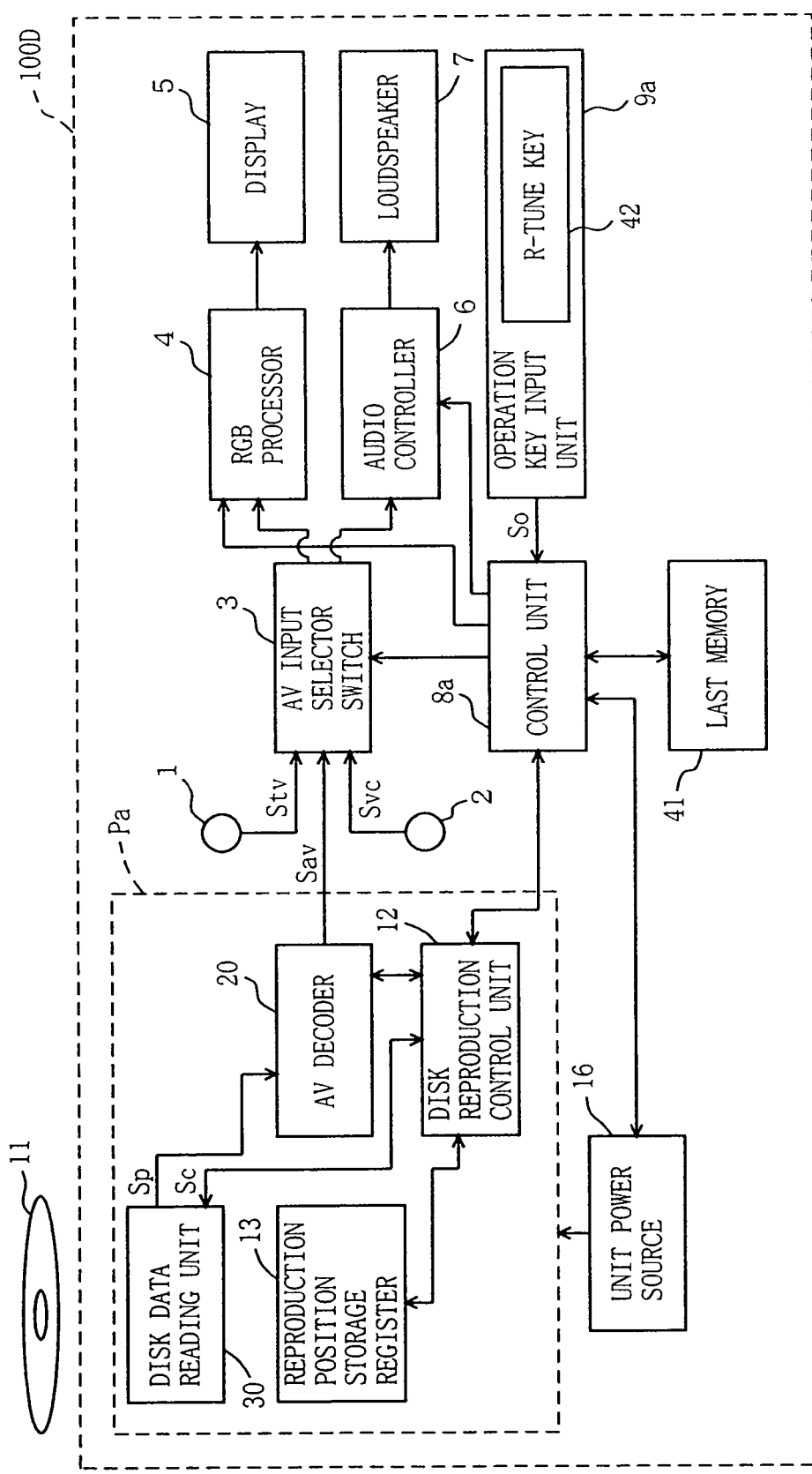
FIG. 6 is a block diagram illustrating a structure of a reproduction apparatus according to a fourth embodiment of the present invention.

With reference to FIG. 6, a television with an internal reproduction apparatus according to a fourth embodiment of the present invention will be described. The television with an internal reproduction apparatus 100D according to the present embodiment is constructed identically to the television with an internal reproduction apparatus 100A shown in FIG. 1 except that a unit power source 16 for supplying power to the optical disk reproduction apparatus Pa is additionally provided. The unit power source 16 is controlled by the control unit 8a so as to generate unit power, which is required for driving the optical disk reproduction apparatus Pa, from main power which is supplied from an external main power source (not shown).

The present embodiment is aimed at improving the power consumption when a temporary retention request for the optical disk reproduction apparatus Pa is made. In other words, the operation in the aforementioned second viewing mode differs from that according to the first embodiment. Specifically, if the R-TUNE key 42 is manipulated during the reproduction and viewing of the optical disk 11, the control unit 8a makes a temporary retention request to the disk reproduction control unit 12. The disk reproduction control unit 12 determines the current reproduction position, and writes the content thereof to the reproduction position storage register 13, and makes a stop request to the disk data reading unit 30. Furthermore, after performing a data backup, the disk reproduction control unit 12 reports completion to the control unit 8a. Upon detecting the content thereof, the control unit 8a stops the unit power source section 16.

If a request for reproduction is again made by the operation key input unit 9 to the optical disk reproduction apparatus Pa, then the control unit 8a operates the unit power source section 16. As power supply from the unit power source 16 is restored, the disk reproduction control unit 12 begins operating, and first determines the content written in the reproduction position storage register 13. If valid, the content is read, and an instruction is given to the disk data reading unit 30 to begin reproduction from this position. Thereafter, the control unit 8a immediately switches the AV input selector switch 3 so as to couple to the optical disk reproduction apparatus Pa. Thus, the power supply during a period of temporary retention (standby), when it is unnecessary to keep the optical disk reproduction apparatus Pa activated, is terminated so as to prevent unwanted power consumption.

Figure 7:
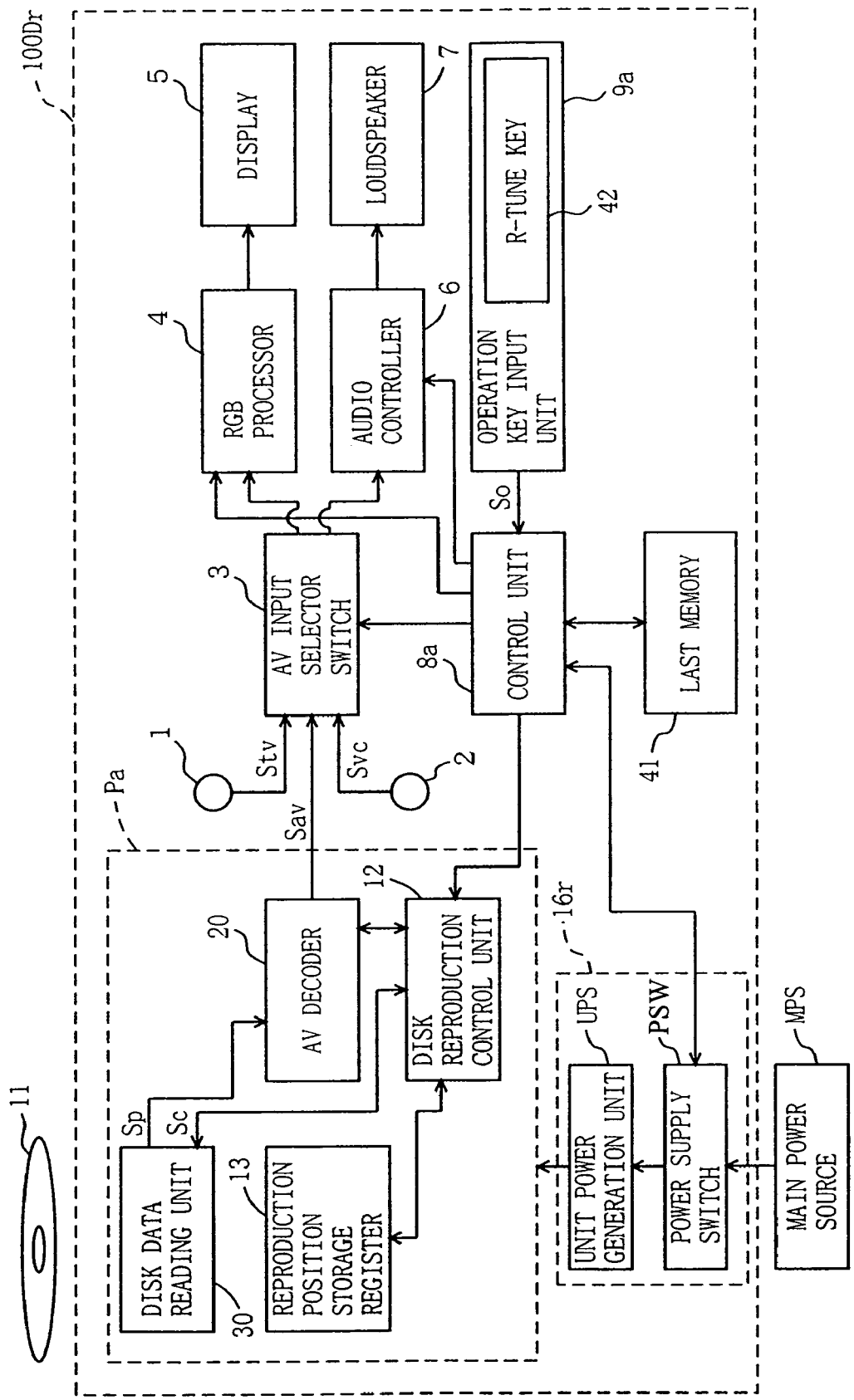
FIG. 7 is a block diagram illustrating a structure of a variant of the reproduction apparatus shown in FIG. 6.

With reference to FIG. 7, a variant of the television with an internal reproduction apparatus according to the fourth embodiment will be described. In the television with an internal reproduction apparatus 100Dr according to the present embodiment, a main power source MPS for supplying power to the television with an internal reproduction apparatus 100Dr as a whole is additionally provided, with the unit power source 16 being replaced by a unit power supply unit 16r. The unit power supply unit 16r includes a unit power generation unit UPS for generating from the main power a unit power for driving the optical disk reproduction apparatus Pa, as well as a main power source supply switch PSW. The unit power generation unit UPS is coupled to the main power source MPS via the main power source supply switch PSW.

This is aimed at further enhancing the reduction in power consumption when a temporary retention request for the optical disk reproduction apparatus Pa is made in the television with an internal reproduction apparatus 100D. That is, the power supplying method for the optical disk reproduction apparatus Pa in the aforementioned second viewing mode slightly differs from that according to the fourth embodiment. Specifically, in accordance with the television with an internal reproduction apparatus 100Dr, when a temporary retention request to the optical disk reproduction apparatus Pa is made, the control unit 8a operates the power supply switch PSW so as to terminate the supply of main power to the unit power generation unit UPS (and hence the unit power supply unit 16r). In accordance with television with an internal reproduction apparatus 100D, on the other hand, the supply of main power to the unit power source 16 is not terminated even when the unit power source section 16 is stopped.

Stated otherwise, the unit power source 16 and the unit power supply unit 16r (unit power generation unit UPS) are power conversion units which convert input primary power to generate secondary power so as to be outputted as unit power. A power conversion unit is liable to energy losses, even when not outputting any secondary power, due to the applied primary power being released in the form of heat or the like. Such energy losses may be smaller than the power which is consumed by the entire optical disk reproduction apparatus Pa or some component elements thereof; however, from the perspective of activation, they constitute an unnecessary power consumption which always exists while the television with an internal reproduction apparatus 100D is being powered. The present variant even prevents unnecessary losses associated with such power conversion.

Fifth Embodiment

Figure 8:
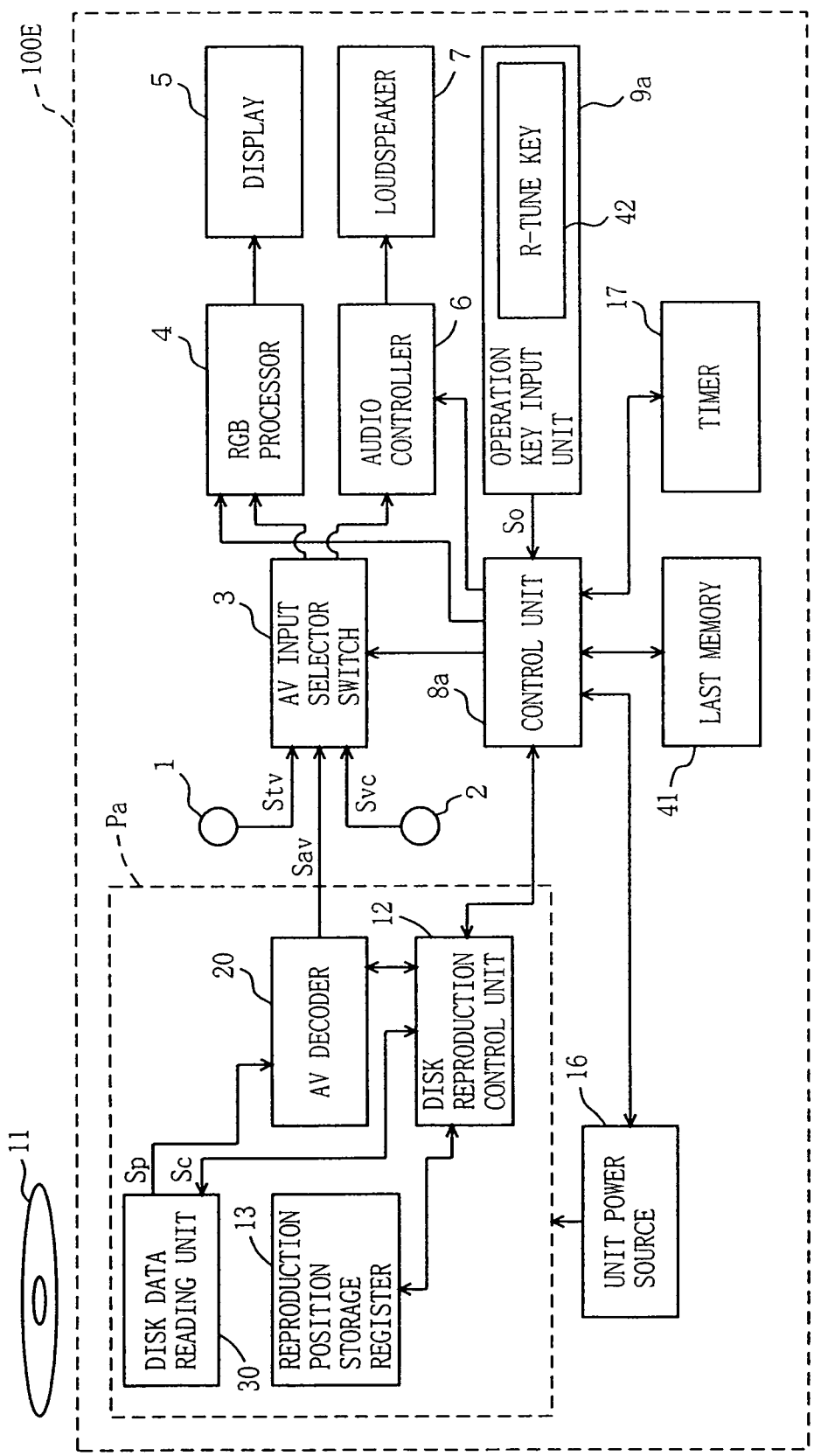
FIG. 8 is a block diagram illustrating a structure of a reproduction apparatus according to a fifth embodiment of the present invention.

With reference to FIG. 8, a television with an internal reproduction apparatus according to a fifth embodiment of the present invention will be described. The television with an internal reproduction apparatus 100E according to the present embodiment is constructed identically to the television with an internal reproduction apparatus 100D shown in FIG. 6 except that a timer 17, which measures an arbitrary period of time T since a switching request is made to the AV input selector switch 3, is additionally provided.

The present embodiment is aimed at improving user feel, power consumption, and product life by delaying the stoppage of the optical disk reproduction apparatus Pa associated with a temporary retention request for the optical disk reproduction apparatus Pa by a predetermined period of time. From the perspective of power consumption, it is generally desirable to immediately terminate power supply to the optical disk reproduction apparatus Pa in response to a temporary retention request. However, it takes a considerable amount of booting power to reboot an once-stopped optical disk reproduction apparatus Pa, as compared to that required during operation. Therefore, in the case where a user interrupts viewing on the optical disk reproduction apparatus Pa to confirm the contents of a television broadcast or the like, and thereafter restarts the viewing on the optical disk reproduction apparatus Pa, it may be possible to better suppress power consumption by keeping the optical disk reproduction apparatus Pa activated, depending on the interruption time. Furthermore, from the perspective of the longevity of the optical disk reproduction apparatus Pa, it is more advantageous to minimize the number of reboots which incur considerable booting power. There is also a problem in that, since rebooting the optical disk reproduction apparatus Pa takes time, a user who has interrupted viewing on the optical disk reproduction apparatus Pa will have to wait in order to resume viewing, thus detracting from user feel.

In other words, from the perspective of energy conservation including resource conservation, it may not be best to immediately terminate power supply to the optical disk reproduction apparatus Pa upon a temporary retention request. It is important to maintain a balance among three key factors, i.e., amount of power saved by immediately stopping power supply to the optical disk reproduction apparatus Pa; amount of power consumed for rebooting the optical disk reproduction apparatus Pa; and longevity of the optical disk reproduction apparatus Pa as associated with continuous activation and intermittent activation. Furthermore, user feel would be a fourth important key factor for a commercial product. The optimum values of these factors should be appropriately determined for each unit in accordance with its physical properties and mode of use, and cannot be univocally determined. Therefore, in order to provide a television with an internal reproduction apparatus which takes these four different key factors into account, a means for adjusting the time during which to stop the power supply to the optical disk reproduction apparatus Pa in response to a temporary retention request is further provided according to the present variant.

In other words, the operation in the aforementioned second viewing mode slightly differs from that according to the fifth embodiment. Specifically, when a switching request is made via the R-TUNE key 42 to recouple from the optical disk reproduction apparatus Pa to the TV input, the control unit 8a immediately allows the timer 17 to start operating. Furthermore, the control unit 8a instructs the AV input selector switch 3 to switch inputs, and instructs the disk reproduction control unit 12 to perform a temporary retention. After writing the current reproduction position to the reproduction position storage register 13, the disk reproduction control unit 12 stops the disk data reading unit 30. Thereafter, unless a request for switching input signals is made via the operation key input unit 9 before the lapse of the arbitrary period of time T (as known from the detection of an interruption signal from the timer 17), the control unit 8a performs a process of stopping the disk reproduction control unit 12.

Upon receiving a completion signal from the disk reproduction control unit 12, the control unit 8a immediately stops the unit power source 16. Thereafter, as the R-TUNE key 42 is manipulated to instruct to the optical disk reproduction apparatus Pa to reproduce, the control unit 8a turns on the unit power source 16 to restart power supply to the optical disk reproduction apparatus Pa. The disk reproduction control unit 12 again becomes activated, and reads the reproduction stored position which is stored in the reproduction position storage register 13, and performs a process of setting the position in the disk data reading unit 30. The data which has been read from the disk data reading unit 30 is subjected to AV data reproduction by the AV decoder 20, and presented via the AV input selector switch 3.

Figure 9:
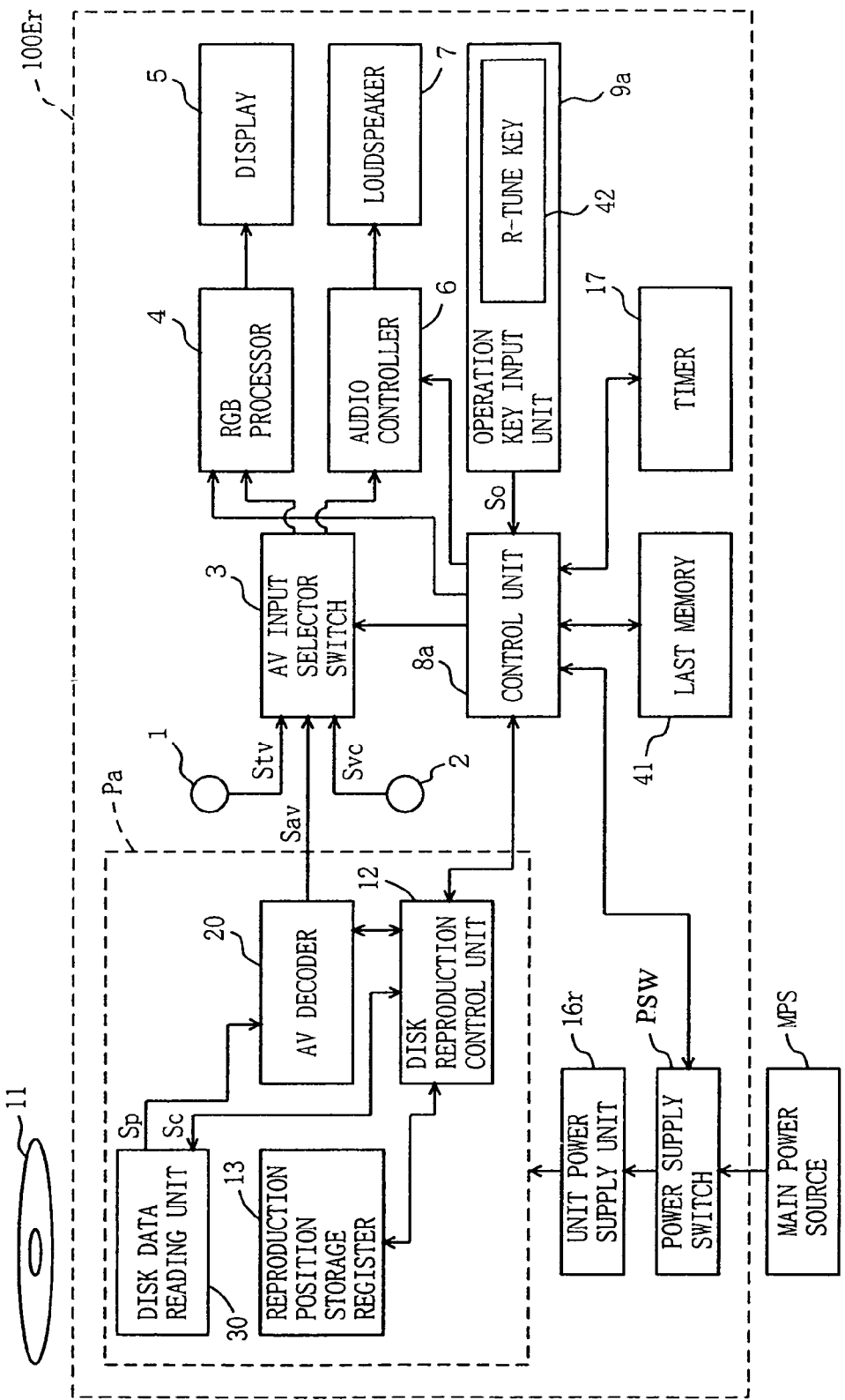
FIG. 9 is a block diagram illustrating a structure of a variant of the reproduction apparatus shown in FIG. 8.

With reference to FIG. 9, a variant of the television with an internal reproduction apparatus according to the fifth embodiment of the present invention will be described. In the television with an internal reproduction apparatus 100Er according to the present embodiment, a main power source MPS for providing power the television with an internal reproduction apparatus 100Er as a whole is additionally provided, with the unit power source 16 being replaced by a unit power supply unit 16r. The main power source MPS and the unit power supply unit 16r have the same structure, and are provided for the same purposes, as those in the television with an internal reproduction apparatus 100Dr which has been described with reference to FIG. 7. The aim is to further enhance the reduction in power consumption when a temporary retention request for the optical disk reproduction apparatus Pa is made in the television with an internal reproduction apparatus 100E. In other words, as in the case of a variant of the fourth embodiment, i.e., the television with an internal reproduction apparatus 100Dr, the power supplying method for the optical disk reproduction apparatus Pa in the aforementioned second viewing mode terminates supply of main power to the unit power supply unit 16r to stop the optical disk reproduction apparatus Pa in the television with an internal reproduction apparatus 100Er as well.

Sixth Embodiment

Figure 10:
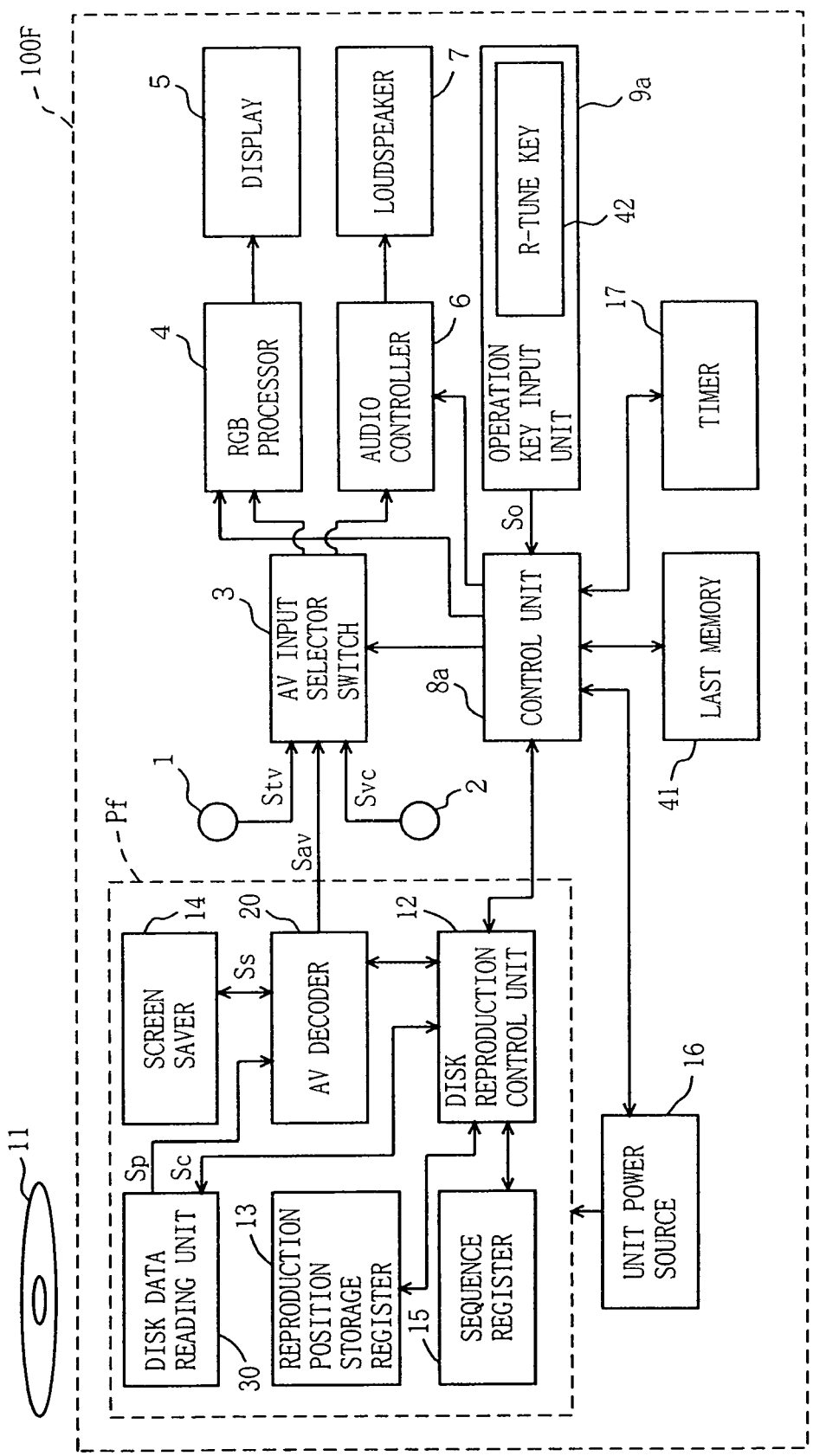
FIG. 10 is a block diagram illustrating a structure of a reproduction apparatus according to a sixth embodiment of the present invention.

With reference to FIG. 10, a television with an internal reproduction apparatus according to a sixth embodiment of the present invention will be described. The television with an internal reproduction apparatus 100F according to the present embodiment is constructed so as to encompass all of the features of the television with an internal reproduction apparatus according to the first embodiment, the second embodiment, the third embodiment, the fourth embodiment, and the fifth embodiment described above. In other words, the television with an internal reproduction apparatus 100F incorporates an optical disk reproduction apparatus Pf, which is the optical disk reproduction apparatus Pa in the television with an internal reproduction apparatus 100E as shown in FIG. 8 plus a screen saver 14 and a sequence register 15. In the optical disk reproduction apparatus Pf, the relationship with the screen saver 14 is as described concerning the optical disk reproduction apparatus Pb with reference to FIG. 4, and the relationship with the sequence register 15 is as described concerning the optical disk reproduction apparatus Pc with reference to FIG. 5.

The present embodiment also aims to improve the power consumption of the optical disk reproduction apparatus Pe when a temporary retention request is made. That is, when a switching request is made to the original channel number via manipulation of the R-TUNE key 42, the control unit 8a determines the content thereof, sets the tuner associated with a TV input which is coupled to the AV input selector switch 3 using the channel number stored in the last memory 41, and also switches the AV input selector switch 3 to couple to the TV input.

Furthermore, the control unit 8a makes a sequential determination request to the disk reproduction control unit 12. The disk reproduction control unit 12 returns the content of the sequence register 15 to the control unit 8a. If it indicates multi-sequential, the control unit 8a makes a stop request to the disk reproduction control unit 12. In response, the disk reproduction control unit 12 stops the disk data reading unit 30, and allows the screen saver 14 to operate so that a screen saver signal Ss is outputted to the AV input selector switch 3 via the AV decoder 20.

If the content of the sequence register 15 indicates single sequential, then the timer 17 is booted, and a temporary retention request is made to the disk reproduction control unit 12. The disk reproduction control unit 12 writes the current reproduction position to the reproduction position storage register 13, and stops the disk data reading unit 30.

If a request for reproduction processing for the optical disk reproduction apparatus Pf is made to the key operation input section 9a before the lapse of the arbitrary period of time T, the control unit 8a immediately determines it and places the request to the disk reproduction control unit 12. The disk reproduction control unit 12 reads the reproduction position from the reproduction position storage register 13, and sets the position in the disk data reading unit 30 and instructs it to start reproduction.

If a request for reproduction processing for the optical disk reproduction apparatus Pf is not made before the lapse of the arbitrary period of time T, then the timer 17 makes an interruption request to the control unit 8a. After confirming completion of a backup of the optical disk reproduction apparatus Pf, the control unit 8a stops the unit power source 16 to terminate power supply to the optical disk reproduction apparatus Pf.

If the R-TUNE key 42 is manipulated again after power supply to the optical disk reproduction apparatus Pf is terminated, the control unit 8a determines the content thereof and turns on the unit power source section 16. Since the power source is turned on, the disk control 12 reads the content of the sequence register 15, and performs reproduction with the disk read section 30, either from the position as stored in the reproduction position storage register 13 if it indicates single sequential or from an initial position if it indicates multi-sequential.

The data which has been recalled from the disk data reading unit 30 is decoded by the AV decoder 20 into an AV signal, and via the AV input selector switch 3 which has been switched by the control unit 8a to couple to the optical disk 11, decoded by the RGB processor 4 into RGB signals so as to be displayed on the display 5 and decoded by the audio controller 6 into sounds to be reproduced via the loudspeaker 7.

Figure 11:
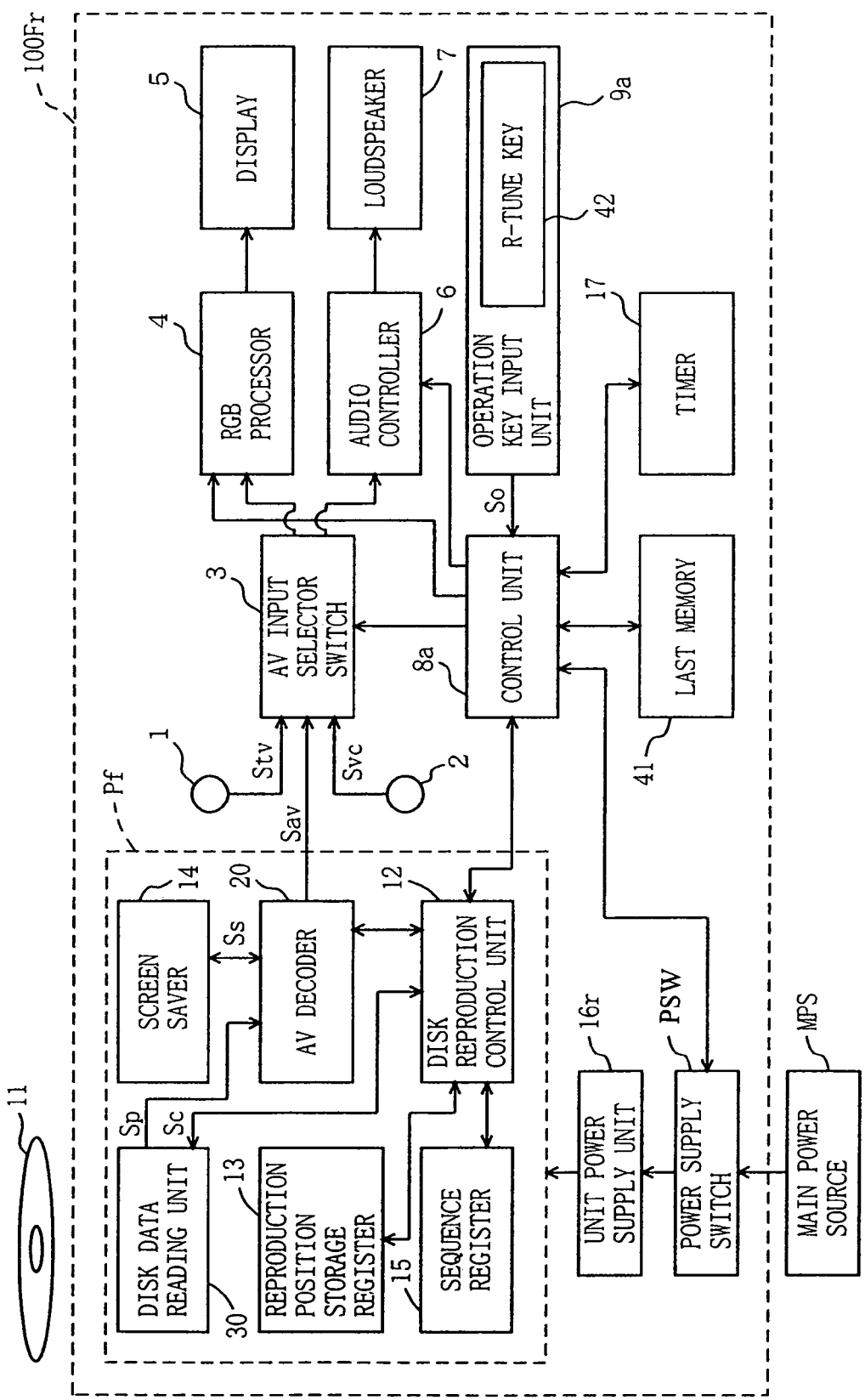
FIG. 11 is a block diagram illustrating a structure of a variant of the reproduction apparatus shown in FIG. 10.

With reference to FIG. 11, a variant of the television with an internal reproduction apparatus according to the sixth embodiment of the present invention will be described. In the television with an internal reproduction apparatus 100Fr according to the present embodiment, a main power source MPS for supplying power to the television with an internal reproduction apparatus 100Fr as a whole is additionally provided, with the unit power source 16 being replaced by a unit power supply unit 16r. The main power source MPS and the unit power supply unit 16r have the same structure, and are provided for the same purposes, as those in the television with an internal reproduction apparatus 100Dr which has been described with reference to FIG. 7. The aim is to further enhance the reduction in power consumption when a temporary retention request for the optical disk reproduction apparatus Pa is made in the television with an internal reproduction apparatus 100E. In other words, as in the case of a variant of the fifth embodiment, i.e., the television with an internal reproduction apparatus 100Er, the power supplying method for the optical disk reproduction apparatus Pa in the aforementioned second viewing mode terminates supply of main power to the unit power supply unit 16r to stop the optical disk reproduction apparatus Pa in the television with an internal reproduction apparatus 100Fr as well.

Although a case where the R-TUNE key 42 is employed for the key manipulation is exemplified above, it will be appreciated that similar effects can also be obtained in the case where a channel number is inputted directly to the operation key input unit 9a, such being encompassed within the present invention.

INDUSTRIAL APPLICABILITY

As described above, this invention can be used for applications directed to a television apparatus or the like which switches between a video signal which is distributed from an external video signal source such as cable television or a collective reception facility, and a video signal which is reproduced from an internally-incorporated video signal source such as an optical disk reproduction apparatus for viewing, where energy conservation, device life, and user feel are all taken care of.

What is claimed:

1. A reproduction apparatus for selectively switching for reproduction between first information, which is read from an internal recording medium, and second information, which is distributed from an externally-provided information source on a plurality of channels, in accordance with a user selection, the reproduction apparatus comprising:

an information signal generation means for reading the first information from the internal recording medium to generate a first information signal;

an information signal input means for specifying a requested channel to the externally-provided information source, and inputting a second information signal in response to the second information provided on the specified channel;

a selection signal generation means for generating a selection signal representing a user selection in accordance with a user manipulation;

an information signal selection means for selecting either one of the first or second information signals in response to the selection signal, the information signal generation means comprising a data structure determinations means for determining, from the first information read out from the recording medium, whether data recorded on the recording medium is of a single sequential structure or a multi-sequential structure, and a data structure storing means for storing a result of the structure determination;

an information reproduction means for reproducing information from the first or second information signal selected by the information signal selection means; and an information reproduction control means for controlling how to start reproduction of the first and second information, when the first and second information signals are switched for reproduction based on the selection signal, wherein the information reproduction control means comprises:

a readout position storage means for storing a readout position of the first information on the internal recording medium, a channel storage means for storing a requested channel as specified to the externally-provided information source by the information signal input means, if the result of the structure determination stored in the data structure storage means indicates a single sequential structure, a first control means for causing the channel storage means to store the requested channel currently specified to the information source by the information signal input means and controlling the information signal generation means to read the first information from the readout position stored in the readout position storage means, if the first information is selected by the selection signal, and a second control means for causing the readout position storage means to store a position at which the information signal generation means is currently reading out the first information and controlling the information signal input means to specify the requested channel stored in the channel storage means to the information source, if the second information is selected by the selection signal and the result of the determination stored in the data structure storage means indicates a single sequential structure.

2. The reproduction apparatus according to claim 1, wherein the information signal generation means comprises a third control means for prohibiting the first control means from controlling the information signal generation means to read the first information from a readout position stored in the readout position storage means, if the second information is selected by the selection signal and the result of the determination stored in the data structure storage means indicates a multi-sequential structure, and the information reproduction control means comprises a fourth control means for stopping the information signal generation means, if the second information is selected by the selection signal.

3. The reproduction apparatus according to claim 2, further comprising:

a driving power source means for supplying driving power to the information signal generation means, wherein the fourth control means comprises a power supply stoppage means for controlling the driving power source means to stop supplying the driving power to the information signal generation means.

4. The reproduction apparatus according to claim 2, further comprising:

a driving power source means for supplying driving power to the information signal generation means, wherein the fourth control means comprises a power supply stoppage means for controlling the driving power source means to stop supplying the driving power to the information signal generation means, a timer means for measuring a predetermined period of time since the second information is selected by the selection signal, and a power supply stoppage delaying means for delaying operation of the power supply stoppage means until the predetermined period of time elapses.

5. The reproduction apparatus according to claim 2, further comprising:

a driving power source means comprising a driving power generation means for generating the driving power from main power, which is supplied from an externally-provided main power source means, and a main power supply switch for coupling the driving power generation means to the main power source means so as to supply main power, wherein the fourth control means comprises a main power supply stoppage means for controlling the main power supply switch to stop supplying the main power.

6. The reproduction apparatus according to claim 2, further comprising:

a driving power source means comprising a driving power generation means for generating driving power from main power, which is supplied from an externally-provided main power source means, and a main power supply switch for coupling the driving power generation means to the main power source means so as to supply main power, wherein the fourth control means comprises a main power supply stoppage means for controlling the main power supply switch to stop supplying the main power, and the information signal generation means further comprises a timer means for measuring a predetermined period of time since the second information is selected by the selection signal, and a main power supply stoppage delaying means for delaying the operation of the main power supply stoppage means until the predetermined period of time elapses.

* * * * *

UNITED STATES PATENT AND TRADEMARK OFFICE
CERTIFICATE OF CORRECTION

PATENT NO. : 7,672,571 B2  Page 1 of 1
APPLICATION NO. : 11/647209
DATED : March 2, 2010
INVENTOR(S) : Toyoaki Unemura It is certified that error appears in the above-identified patent and that said Letters Patent is hereby corrected as shown below:

On the Title Page

Insert the following:

Item --(30)    Foreign Application Priority Data

March 13, 2000    [JP]    Japan................2000-068312--

Signed and Sealed this

Fifteenth Day of June, 2010

David J. Kappos
*Director of the United States Patent and Trademark Office*